(12) United States Patent
Maillot et al.

(10) Patent No.: US 10,372,308 B2
(45) Date of Patent: *Aug. 6, 2019

(54) PREDICTIVE MATERIAL EDITOR

(71) Applicant: AUTODESK, INC., San Rafael, CA (US)

(72) Inventors: Jerome Maillot, Cazaux (FR); Pierre-Felix Breton, Chambly (CA); John Schrag, Toronto (CA); Andre Gauthier, Quebec (CA)

(73) Assignee: AUTODESK, INC., San Rafael, CA (US)

( * ) Notice: Subject to any disclaimer, the term of this patent is extended or adjusted under 35 U.S.C. 154(b) by 548 days.

This patent is subject to a terminal disclaimer.

(21) Appl. No.: 14/195,026

(22) Filed: Mar. 3, 2014

(65) Prior Publication Data

US 2014/0181719 A1 Jun. 26, 2014

Related U.S. Application Data

(63) Continuation of application No. 12/187,332, filed on Aug. 6, 2008, now Pat. No. 8,667,404.

(51) Int. Cl.
| | | |
|---|---|---|
| *G06F 3/0484* | (2013.01) | |
| *G06F 9/44* | (2018.01) | |
| *G06T 7/40* | (2017.01) | |
| *G06F 9/451* | (2018.01) | |

(52) U.S. Cl.
CPC .......... *G06F 3/04842* (2013.01); *G06F 9/451* (2018.02)

(58) Field of Classification Search
CPC .. G06T 15/06; G06T 1/60; G06T 1/20; G06T 15/005; G06T 19/20; G06T 11/001; G06T 2210/36; G06T 15/00; G06T 15/20; G06T 19/003; G06T 15/04; G06T 2200/04; G06T 11/60; G06T 2200/24; G06T 2215/16; G06T 15/205; G06T 15/80; G06T 17/10; G06T 7/40; G06T 7/60; G06F 17/50; G06F 3/0481; G06F 2217/02; G06F 2217/06; G06F 3/04842; G06F 9/451;

(Continued)

(56) References Cited

U.S. PATENT DOCUMENTS

| | | | | |
|---|---|---|---|---|
| 2005/0081161 A1* | 4/2005 | MacInnes | ........... | G06F 17/5004 715/765 |
| 2008/0012856 A1* | 1/2008 | Yu | .......................... | G06T 7/0012 345/424 |
| 2009/0021513 A1* | 1/2009 | Joshi | ..................... | G06T 15/005 345/419 |

\* cited by examiner

*Primary Examiner* — Tadesse Hailu
(74) *Attorney, Agent, or Firm* — Artegis Law Group, LLP

(57) ABSTRACT

A method for generating a user interface within a graphics application for a set of materials, such that each material includes a material definition and is capable of being applied to a geometry in a graphics scene when performing a rendering operation. A GUI generation engine obtains configuration information associated with an environment for a computer system and determines that a first set of materials is associated with the configuration information. The GUI generation selects the first set of materials to be displayed in a graphical user interface, and the graphical user interface is displaying to an end-user. Advantageously, embodiments of the invention provide for a technique for exposing only those materials, user interface objects, editable material parameters, user interface elements, vocabulary, rendering engines, and/or rendering engine implementations that are relevant to the user of a particular rendering application.

28 Claims, 7 Drawing Sheets

(58) Field of Classification Search
CPC .... G06F 3/0482; G06F 17/24; G06F 3/04815; H04N 21/47205
See application file for complete search history.

PREDICTIVE MATERIAL EDITOR

CROSS-REFERENCE TO RELATED APPLICATIONS

This application is a continuation of the co-pending U.S. patent application titled, "PREDICTIVE MATERIAL EDITOR," having Ser. No. 12/187,332 and filed Aug. 6, 2008. The subject matter of this related application is hereby incorporated herein by reference.

BACKGROUND OF THE INVENTION

Field of the Invention

The present invention generally relates to computer software. More specifically, the present invention relates to a predictive material editor.

Description of the Related Art

The term computer aided design (CAD) refers to a broad variety of computer-based tools used by architects, engineers, animators, video game designers, and other graphics and design professionals. CAD applications may be used to construct computer models or drawings representing virtually any imaginable two-dimensional (2D) or three-dimensional (3D) construct. Initially, such a construct is defined in part by the regions making up the surface of that construct. A rendering application may be used to add detail to the construct by mapping material texture maps onto various regions of the construct.

Material texture maps, or materials, can be defined according to a variety of parameters, generally related to the type of material represented. For example, a glass material may be defined in part by a reflectivity parameter, while a concrete material may be defined in part by a coarseness parameter. A user of a rendering application may change the values of some or all of these parameters to modify the physically and/or display characteristics of the rendered material. Users of various rendering applications may apply materials to 2D or 3D constructs in different ways according to their specific needs. For example, an architect may use a hardwood floor material as an indoor floor surface and a grass material as an outdoor floor surface; alternatively, a video game designer may use either material for a variety of purposes within a virtual environment.

A problem with current approaches for presenting a user interfaces (UI) for manipulating graphics materials or texture maps in graphics rendering applications is that users without an extensive rendering background have difficulty manipulating the UIs. These users are generally not familiar with the functionality of the underlying rendering engine and may have different levels of understanding and expertise with respect to graphics rendering. Additionally, different users may find certain properties of graphics materials to be relevant and other materials to be irrelevant. For example, in the context of lighting, an architect and a video game designer may have very different understandings of lighting effects. The architect may think about lights in terms of the physical properties of lights (e.g., watts, color temperature, or lumens); whereas, the video game designer may view light as simply the opposite of dark and may not think about the physical properties.

As the foregoing illustrates, there remains a need in the art for a material editor that overcomes one or more of the problems set forth above.

SUMMARY OF THE INVENTION

Embodiments of the invention provide a method for generating a user interface within a graphics application for a set of materials, such that each material includes a material definition and is capable of being applied to a geometry in a graphics scene when performing a rendering operation. A GUI generation engine obtains configuration information associated with an environment for a computer system and determines that a first set of materials is associated with the configuration information. Each material is associated with a set of editable material parameters. Each editable material parameter specifies a characteristic of the material to use in the rendering operation in which the material is applied to the geometry. The GUI generation engine then selects the first set of materials to be displayed in a graphical user interface, and the graphical user interface is displayed to an end-user.

Advantageously, embodiments of the invention provide a technique for exposing only the materials, the UI objects, the editable material parameters, the UI elements, the vocabulary, the rendering engines, and/or the rendering engine implementations that are relevant to a user of a particular rendering application.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
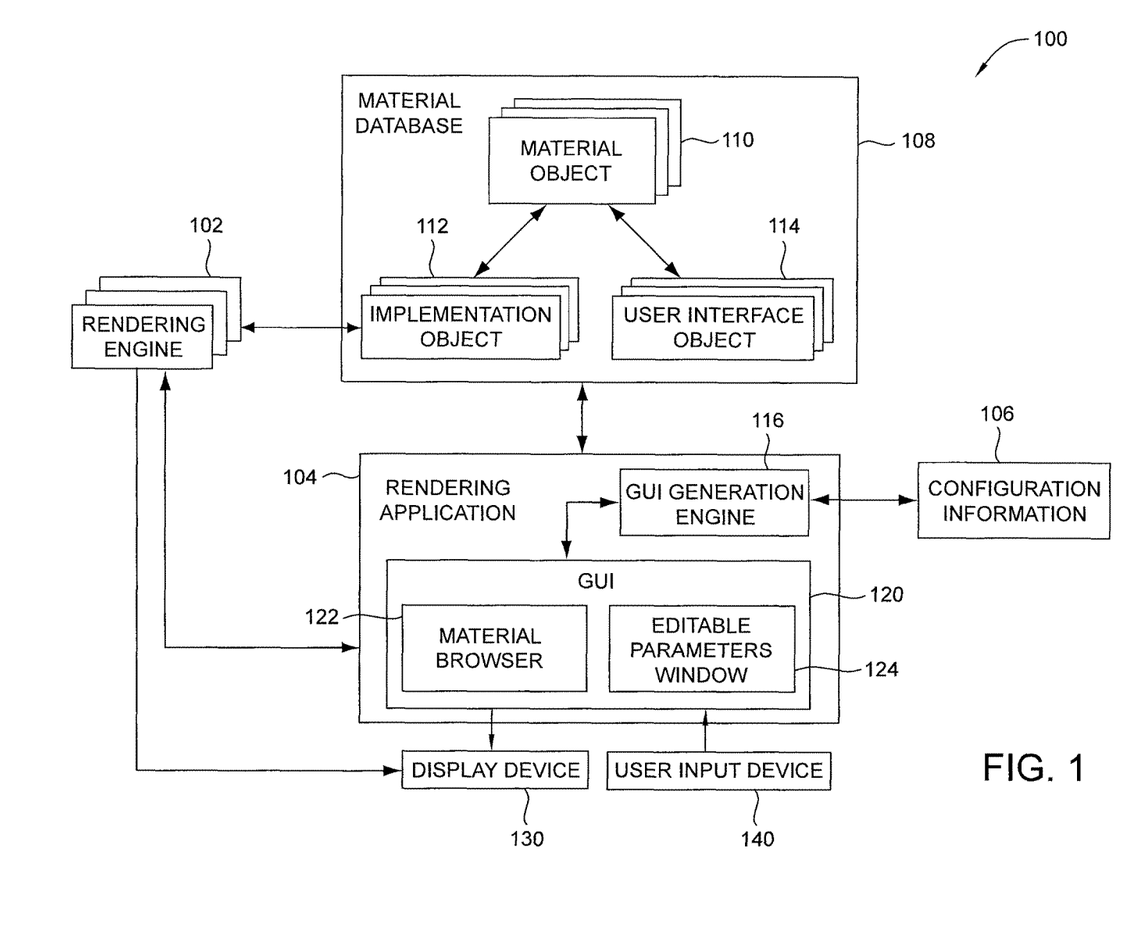
FIG. 1 is a block diagram of a system configured to implement one or more aspects of the present invention.

FIG. 1 is a block diagram of a system 100 configured to implement one or more aspects of the present invention. The components illustrated in FIG. 1 may include computer software applications executing on existing computer systems, e.g., desktop computers, server computers, laptop computers, tablet computers, video game consoles, and the like. The software applications described herein, however, are not limited to any particular computer system and may be adapted to take advantage of new computer systems as they become available.

Additionally, the components illustrated in FIG. 1 may be implemented as software applications that execute on a single computer system or on distributed systems communicating over computer networks such as local area networks or large, wide area networks, such as the Internet. For example, a graphical user interface (GUI) 120 may include a software program executing on a client computer system at one physical location communicating with a rendering application 104 at another physical location. Also, in one embodiment, the rendering application 104 and the GUI 120 may be provided as an application program (or programs) stored on computer readable storage media such as a CD-ROM, DVD-ROM, flash memory module, or other tangible storage media.

As shown, the computer system 100 includes, without limitation, one or more rendering engines 102, the rendering application 104, configuration information 106, a material database 108, a display device 130, and a user input device 140. Each rendering engine 102 is configured to allow users interacting with the GUI 120 to render materials and display those views on the display device 130. In one embodiment, each rendering engine 102 may be configured with one or more rendering engine implementations. For example, a first rendering engine may include a first rendering implementation and a second rendering implementation. The first rendering implementation may provide a low-quality, high-speed rendering implementation for a given material. The first rendering implementation may be appropriate when rendering in real-time, e.g., to give the user a quick impression of the appearance of a given material within a scene. The second rendering implementation may be a high-quality, low-speed rendering implementation. The second rendering implementation may be appropriate when rendering a final version of a scene, giving more fine-grained results.

As shown, the material database 108 includes one or more material objects 110, one or more implementation objects 112, and one or more user interface objects 114. The material database 108 may be located within any memory subsystem within the computer system 100 or on a machine remote to the computer system 100. In certain embodiments, the material database 108 may be distributed across memory locations within the computer system 100 or between the computer system 100 and a machine remote to the computer system 100.

Material objects 110 may represent graphics materials definitions. The definitions may include data for materials that corresponds to lights, animation data, simulation data, display properties of the material, physical properties of the material, and the like. For example, each construct in a graphics scene may be composed of one or more pieces of geometry, e.g., a collection of triangles or polygons. A material to use in rendering that construct may then be associated with the one or more pieces of geometry. Common examples of graphics materials represented by material objects 110 include a painted wall material, concrete materials, metal materials, glass materials, and water materials, etc. In alternative embodiments, the material objects 110 may define volumetric materials, such as fire, smoke, clouds, 3D shapes, and the like.

Each material object 110 may include strongly-typed parameters representing the relevant characteristics of a given material. The parameters define the physical and/or display characteristics of the material object 110. For example, a material object 110 corresponding to a painted wall surface could include parameters for color, application or brush type, and finish. In a second example, a material object 110 corresponding to a fluorescent light could include parameters for light intensity or color temperature. The fluorescent light material could also include a physical parameter for wattage, to be used by a simulation or animation application. Because the parameters of the graphics asset are strongly-typed, users can easily identify the characteristics to use in rendering or simulating a given material. The specific parameters for the material corresponding to an underlying rendering engine, simulation engine, or animation engine need not be known to the user.

In addition, by strongly typing the parameters to the characteristics of the material objects 110, the user interface objects 114 may present the user with the appropriate user interface constructs, regardless of the underlying implementation object 112 or rendering engine 102 used for rendering. For example, continuing with the example of a material object 110 corresponding to a material resenting a painted wall surface, the user interface object 114 may present the user a color type parameter using interface elements that allow a user to specify an RGB color value, a code reference to a manufacturer catalog, or even sampled spectral values. Similarly, the user interface objects 114 may present the user with drop-down lists for the application type and finish parameters. These drop-down lists could present values for a painted surfed familiar to an architect or designer, such as rolled, sprayed, brushed, matte, glossy, satin, etc. By decoupling the user interface from the graphics material, the system 100 enables different applications to adapt the user interface to the skills of the user. For example, a typical Autodesk® Revit® user will prefer to enter colors from a catalog while an Autodesk® 3ds Max® user may prefer to enter RGB values.

Implementation objects 112 provide an interface between a given material object 110 and a given rendering engine 102. Generally, the implementation objects 112 are configured to receive values for the strongly-typed parameters and also to translate these values into an appropriate format for one of the rendering engines 102 to achieve a desired rendering effect. The translation may be a simple pass-through, such as in the case of passing of RGB color values, but can also be a mapping from one value to another. That is, depending on the desired rendering effect, the underlying implementation object 112 may generate multiple parameters from a single material parameter, may indentify libraries, files, shader programs, textures, rendering parameters, or any other values used by a particular rendering engine 102 to achieve a desired effect. By decoupling the rendering engine 102 from the material object 110, the system 100 may be extended with additional rendering engines 102 by adding the appropriate implementation object 112 for each additional rendering engine 102. Further, the system 100 is also designed to be easily extended with new materials for existing rendering engines 102 by simply creating an additional implementation object 112 and material object 110 pairing.

In addition to extending a rendering application to render material objects 110, the system 100 applies to extending a simulation or an animation application. For example, physical properties of material objects 110 may be matched to several simulation engines, including multiple fluid simulators. A first fluid simulator may be optimized for speed, and a second fluid simulator may be optimized for correctness.

As shown, the rendering application 104 includes a GUI generation engine 116 and the GUI 120. The GUI 120 includes a materials browser 122 and an editable parameters window 124. As described in greater detail below, GUI generation engine 116 interacts with the configuration information 106 to expose to a user, via the material browser 112, some or all of the available materials in the material database 108, depending on the data stored in the configuration information 106. In one embodiment, when a material displayed in the materials browser 122 is selected, the editable parameters of the material may be displayed in the editable parameters window 124. A user may interact with GUI elements in the editable parameters window 124 to modify the physical and/or display characteristics of the selected material.

The GUI 120 and the rendered output of the rendering engines 102 may be displayed to the user via the display device 130. The display device 130 may be a CRT or LCD display or any other type of display device. Input is received from the user via the user input device 140, which may be a mouse pointing device, a keyboard, a joystick, a video game controller, or any other type of user input device.

Figure 2:
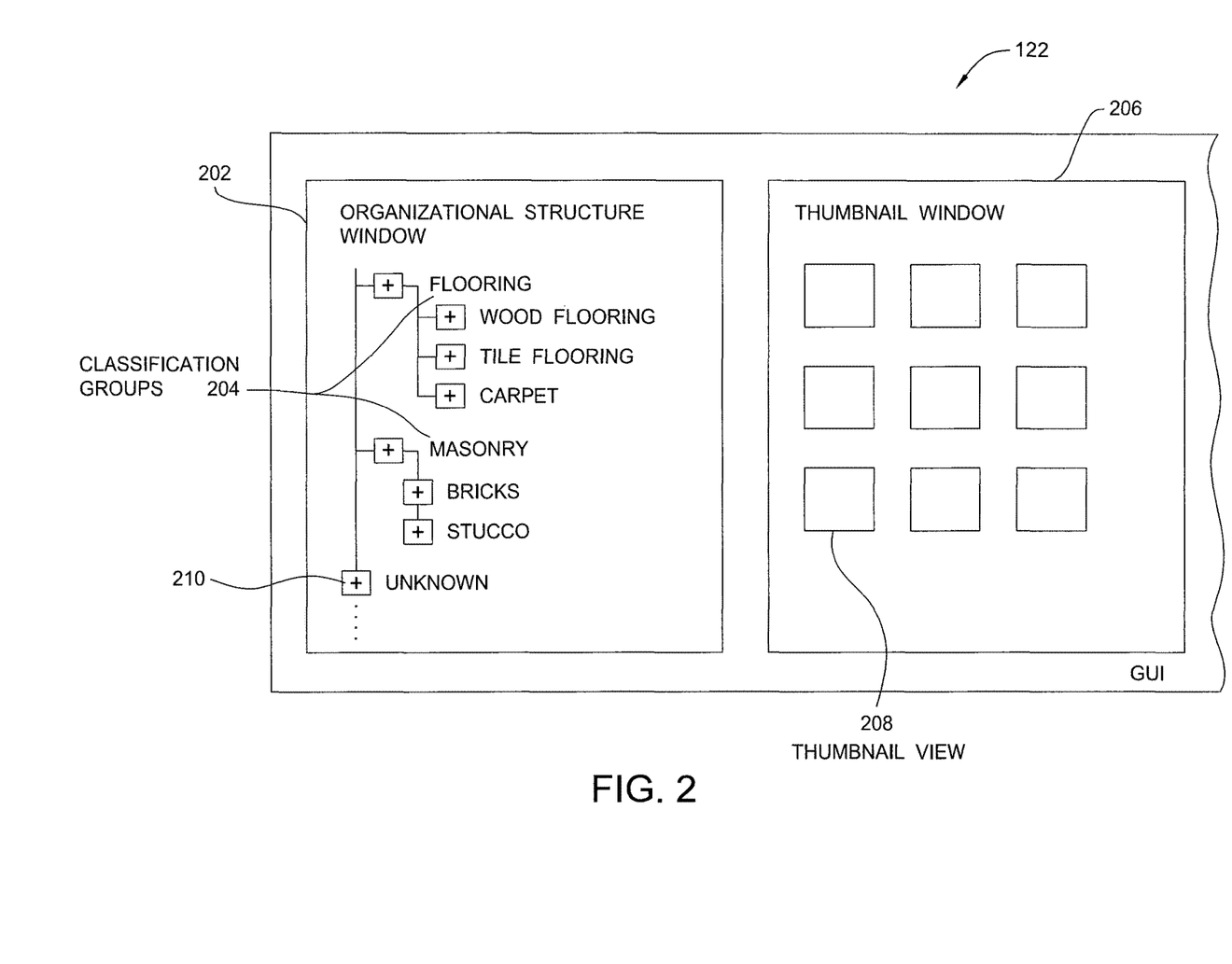
FIG. 2 is a conceptual diagram representing a material browser configured to display an organizational structure of a set of materials included in a material database, according to one embodiment of the invention.

FIG. 2 is a conceptual diagram representing a material browser 122 configured to display an organizational structure of a set of materials included in the material database 108, according to one embodiment of the invention. As shown, the material browser 122 includes an organizational structure window 202 and a thumbnail window 206. As described in greater detail below, the rendering engine 102 may be configured to display to the user only some of the materials available in the material database 108. In one embodiment, materials that are not exposed are not relevant to users of a particular rendering application 104 and/or are not relevant to users with a certain rendering expertise.

The organizational structure of the exposed materials is displayed in the organizational structure window 202. The user may inspect the contents of each level of the organizational structure by selecting with a mouse, or otherwise indicating with another user input device 140, a specific classification group 204. The rendering application then causes the contents of the selected classification group 204, which, in different embodiments, may include either the names of the materials belonging to that classification group or additional lower-level classification groups 204 found within a higher-level classification group 204, to be displayed to the user. In one embodiment, a material may be located in the organizational structure by selecting any of the classification groups 204 to which the material belongs. For example, an oak hardwood floor material that belongs to both a "flooring" classification group and a "wood flooring" classification group may be found by selecting either classification group.

The rendering application is also configured to cause thumbnail views 208 of materials belonging to the selected classification group(s) 204 to be displayed to the user in a thumbnail image window 206, optionally with the names of each material. The user may then select a specific material to apply to a construct within the graphics scene by selecting the thumbnail view 208 of the material with a mouse or otherwise indicating with another user input device 140.

Figure 3:
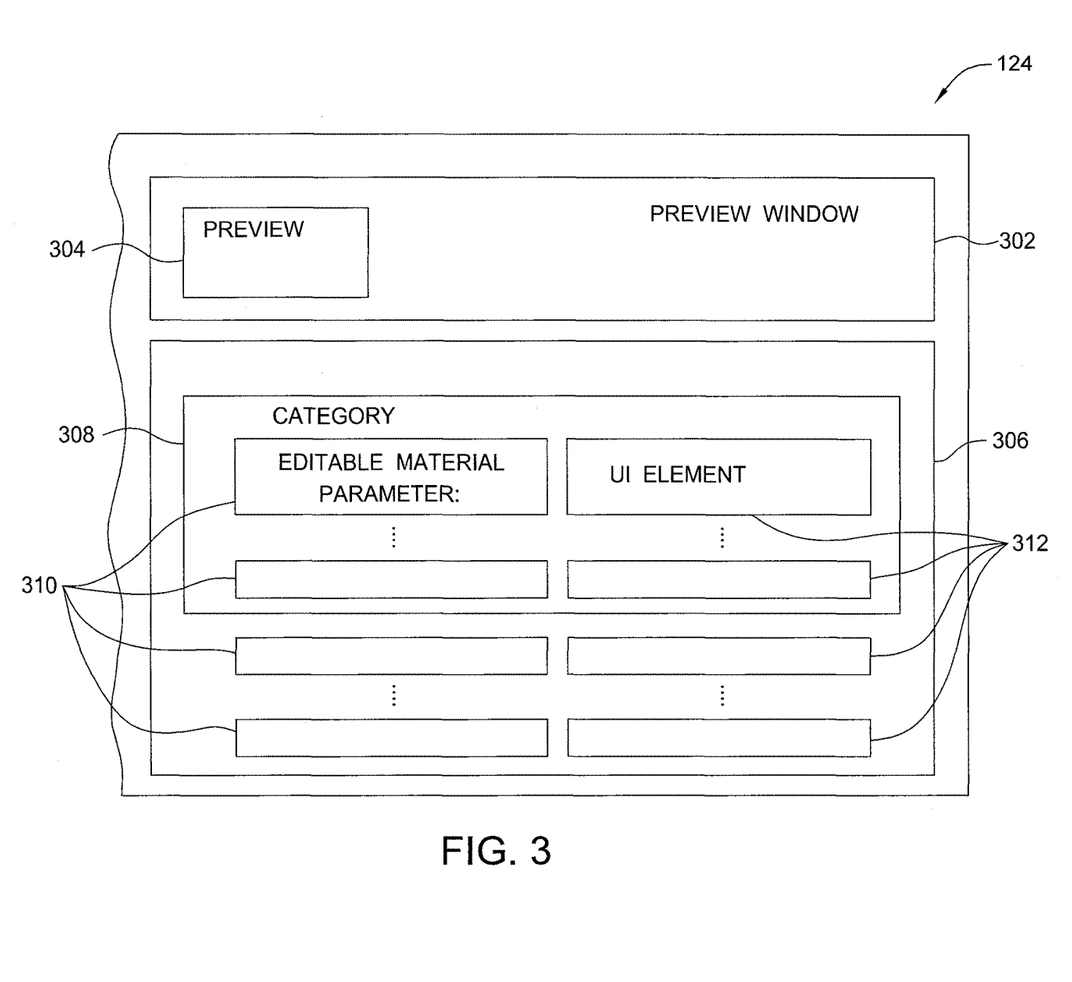
FIG. 3 is a conceptual diagram representing an editable parameters window configured to enable a user to edit the physical or display properties of a selected material, according to one embodiment of the invention.

FIG. 3 is a conceptual diagram representing an editable parameters window 124 configured to enable a user to edit the physical or display properties of a selected material, according to one embodiment of the invention. As described herein, the user may select one of the exposed materials that is available in the material browser 122 by selecting the appropriate thumbnail view 208. After the material has been selected, the rendering application 104 is configured to cause a preview 304 of the material to be displayed to the user in a preview window 302. In one embodiment, metadata associated with the material specifies whether such a preview 304 should be displayed. The rendering application 104 also causes editable material parameters 310 for the material to be exposed to the user via a parameters window 306 and configures the parameters window 306 with the implemented user interface elements (UI elements) 312 corresponding to the exposed editable material parameters 310.

As shown, in various embodiments, related editable material parameters 310 and their corresponding UI elements 312 may be organized and displayed in a category 308. For example, a "color" category may include three editable parameters corresponding to red, green, and blue (RGB) color values as well as an editable transparency parameter and an editable contrast parameter. As a category, these five editable parameters and their corresponding UI elements may be displayed together in a specific area of the parameters window 306. In addition, based on metadata associated with the material, some of the editable material parameters 310 belonging to a particular category 308 may be displayed, while other editable material parameters 310 in the category 308 may be suppressed. For example, the color parameters in a color category may be displayed, while the contrast and transparency parameters in that category may be suppressed. In one embodiment, the UI object 114 associated with the selected material defines the editable material parameters 310 and corresponding UI elements 312 that are to be displayed for the selected material. As described in greater detail below, the selection of a particular UI object 114 for a material may be based on the configuration information 106.

As previously described herein, the user may change the values of the editable material parameters 310 by manipulating the corresponding UI elements 312. When the editable material parameter values are changed, the rendering application 104 is configured to generate an updated preview 304 that reflects those changes and cause the updated preview 304 to be displayed to the user in the preview window 302. The user may then save the modified material as a second version of the material via the material browser 122. In one embodiment, the second version of the material inherits the editable material parameters 310 and corresponding UI elements 312 from the original material. The rendering application 104 is configured to place the second version of the material within the organizational structure according to the inherited data.

Figure 4:
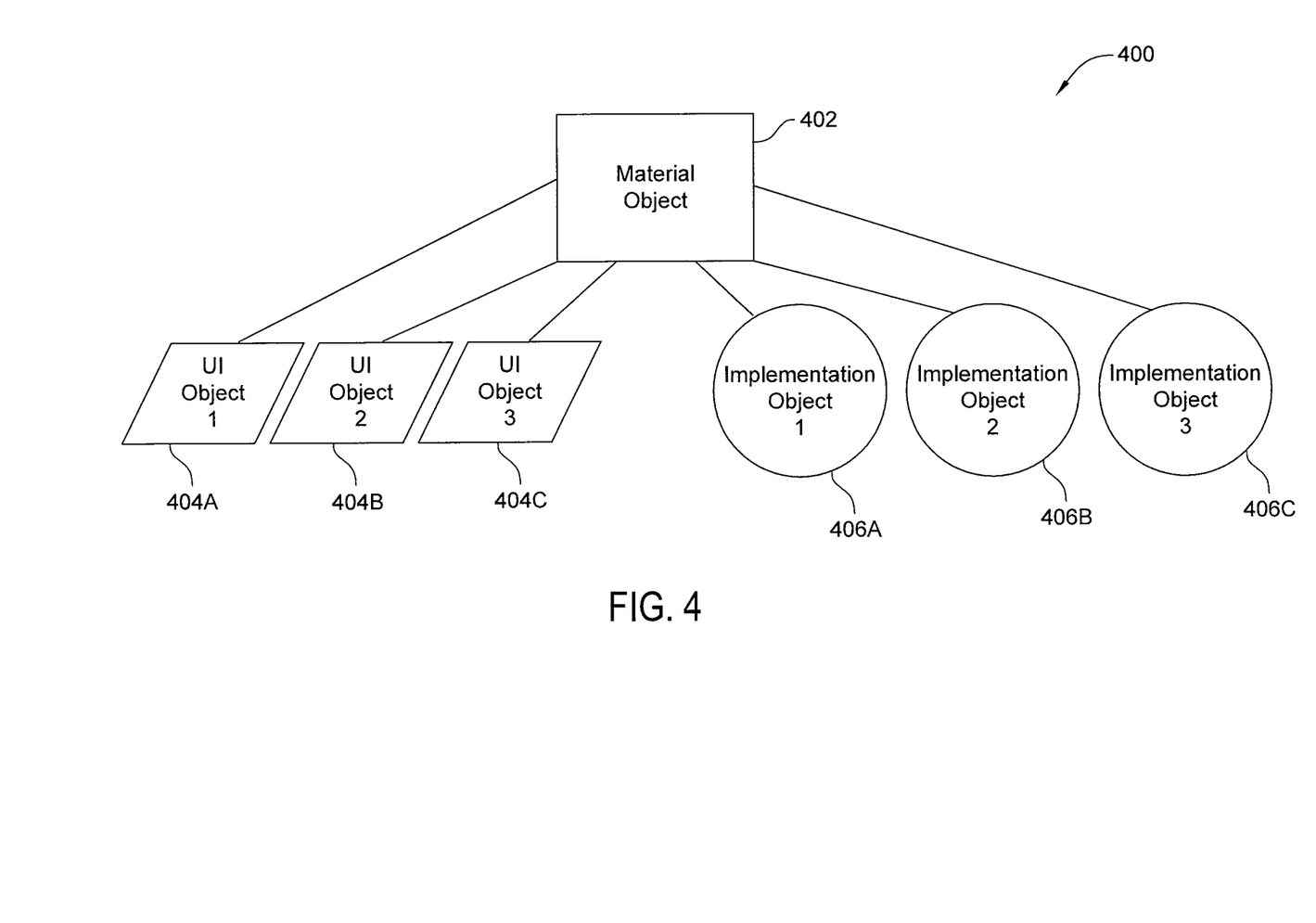
FIG. 4 is a conceptual drawing illustrating components of a material configured to be used with a predictive material editor, according to one embodiment of the invention.

FIG. 4 is a conceptual drawing illustrating components of a material 400 configured to be used with a predictive material editor, according to one embodiment of the invention. As shown, the material 400 may include a material object 402, user interface (UI) objects 404A-404C, and implementation objects 406A-406C. Each UI object 404A-404C that is associated with the material object 402 may specify a different set of editable material parameters and corresponding UI elements for modifying the appearance of the rendered material. Each implementation object 406A-406C may be associated with a different underlying rendering engine (e.g., Mental Ray, RenderMan, or different hardware rendering engines, etc.) and may provide a translation of the values of the editable material parameters into parameters for use with the underlying rendering engine. Using lighting parameters as an example, a first UI object 404A may include a light color editable material parameter that is specified by three numerical values for RGB colors, and a second UI object 404B may include a light color editable material parameter that is specified by a single numerical value for color temperature (or some other physical property of the light). Each of the numerical values associated with the different editable material parameters of the UI elements 404A, 404B may be translated by an implementation object 406A-406C, into a format recognized by the underlying rendering engine.

Embodiments of the invention provide a system where, for each different type of user, application, or market segment, GUI generation engine 116 exposes a different UI object 404A-404C for a particular material. For example, the GUI generation engine 116 may determine that the application is an architecture application, game level editor, film special effects application, or other type of application. From this determination, the GUI generation engine 116 may select the appropriate UI object 404A-404C for each of the material objects to expose to the user. The determination may be made based on configuration information 106. Configuration information 106 includes any information input by the user or collected by the computer system that identifies the type of user or types of tasks that are expected to be performed. The configuration information 106 may be (a) metadata passed from the rendering application to GUI generation engine 116, (b) metadata obtained by the GUI generation engine 116 from an environment variable, (c) a file that is a preset on disk, (d) a registry entry, or (e) other known data used for determining an environment, application type, or user type. Examples of different types of configuration information 106 includes, capabilities of the computer (e.g., how powerful is the graphics card), the primary language of the user, the particular application (e.g., architectural, engineering, artistic, technical, educational, etc.), options selected by the user, options selected automatically by the computer system, customer-site level customizations, scene complexity, among others. Suppose, for example, that the system determines that the application is an architectural application. Based on this determination, the GUI generation engine 116 is configured to present specific UI objects and/or UI elements to the user that are understood by persons in the architecture industry. For example, a UI element for the color of light may be presented with parameters associated with the physical properties of the light.

As described herein, embodiments of the invention may operate at several different levels of abstraction, including the material library level, the material level, the UI element level, the vocabulary choice level, and/or the rendering engine level.

With respect to the material library level, based on the configuration information 106, the rendering engine may expose to the user only a subset of the materials available in the material database 108. For example, the rendering application may expose only those materials that are relevant for the user based on the market segment of the user or the type of application. Some materials may be excluded, or hidden, unless the user specifically asks for those materials. The invention at the library level can serve as a filtering mechanism to limit the available materials based on the usefulness of those materials to the type of user or the market segment.

With respect to the material level, a different UI object, having different editable material parameters, may be displayed based on the market segment of the user or the type of application. This level of abstraction is described in FIG. 4. For example, a first UI object 404A may be presented for the material for a first market segment, and second UI object 404B may be presented for the same material for a second market segment. The first UI object 404A may include an editable material parameter for adjusting the brightness of the material; whereas, the second UI object 404B may not.

With respect to the UI element level, a different UI element may be displayed based on the market segment of the user or the type of application. UI elements include the number and type of tools that a user may use to manipulate the values of an editable material parameter, e.g., a slider, a text input field, a drop-down list, a numerical input field, up/down increment arrows, a color wheel, and the like. For example, a first UI object 404A and a second UI object 404B may both contain a UI element for the color of a light. However, the first UI object 404A may present this UI element as three numerical selections for RGB values; whereas, the second UI object 404B may present this UI element as a single numerical value for color temperature.

With respect to the vocabulary choice level, the same UI element may be displayed with a different name based on the configuration information 106. A specific choice of vocabulary may be more meaningful in a particular market segment. For example, for a first type of rendering application, an editable material parameter may be labeled "bumpiness." In a second type of rendering application, this editable material parameter may be labeled "grain" or "texture."

With respect to the rendering engine level, a certain type of user may prefer a particular rendering engine or rendering engine implementation over another. For example, an architectural user may require a low-quality, but high-speed rendering engine implementation; whereas, a motion picture animation user may desire to use a high-quality, yet slow-speed rendering engine implementation. The rendering application may make available one or more sets of implementation objects, corresponding to certain rendering engines, based on the configuration information, a user profile, and/or rendering skill level of the user.

Figure 5:
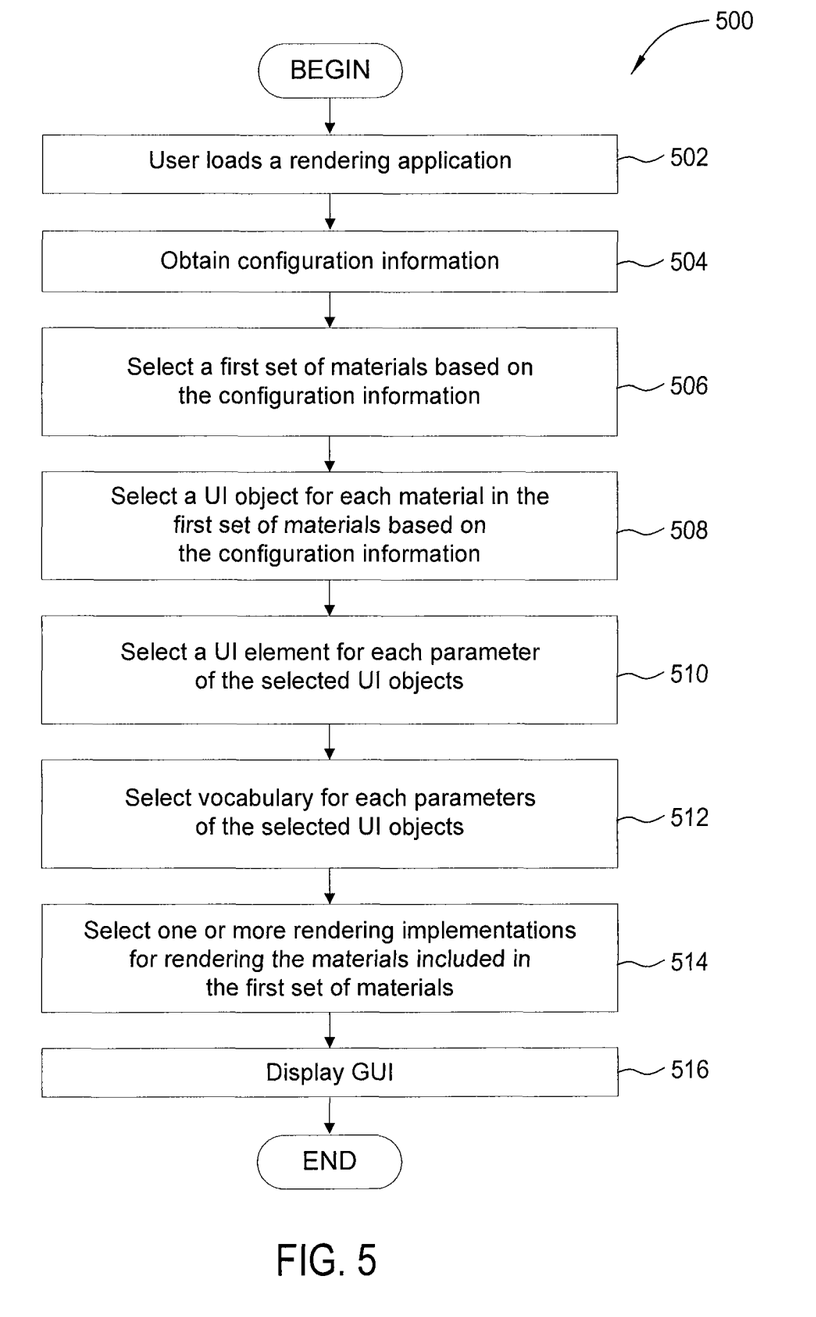
FIG. 5 is a flowchart of method steps for generating a user interface for materials stored within a computer system, according to one embodiment of the invention.

FIG. 5 is a flowchart of method steps for generating a user interface for materials stored within a computer system 100, according to one embodiment of the invention. Persons skilled in the art will understand that, even though the method is described in conjunction with the systems of FIGS. 1-4, any system configured to perform the method steps, in any order, is within the scope of the present invention.

As shown, the method 500 begins at step 502 where a user loads a rendering application 104. The rendering application 104 may be any application that supports the use of materials applied to constructs in a scene. For example, the rendering application may be a CAD application, a 2D or 3D drawing application, an architectural application, a video game creator application, an animation application, a simulation application, a motion picture editing application, and the like.

At step 504, the GUI generation engine 116 obtains configuration information 106. The configuration information 106 is used by the GUI generation engine 116 to determine which materials, associated editable material parameters 310, UI elements 312, and other properties to expose in a material browser 122 and editable parameters window 124. As described above, the configuration information 106 may be metadata (a) passed from the rendering application 104 to GUI generation engine 116, (b) obtained from an environment variable, (c) obtained from a file that is a preset on disk, (d) obtained querying of a registry, or (e) retrieved by any known methods for determining an environment or user type.

At step 506, the GUI generation engine 116 selects a first set of materials based on the configuration information 106. In one embodiment, the first set of materials includes those materials that are relevant to the user of the rendering application 104, but does not include those materials that are not relevant to the user. For example, a user of a high-end motion picture editor application may require hundreds of different glass materials to be available. In contrast, a user of an architectural application may only require two different glass materials to be available, e.g., a clear glass material and a translucent glass material. Based on the configuration information 106, the GUI generation engine 116 displays only those materials that are relevant to a particular user or rendering application 106. In alternative embodiments, users may manually allow certain materials to be exposed (e.g., override the default condition), even if the configuration information 106 indicates that those materials should not be exposed.

At step 508, the GUI generation engine 116 selects a UI object 114 for each material in the first set of materials based on the configuration information 106. As described above, a UI object 114 may present the user with the appropriate user interface constructs, regardless of the underlying implementation object 112 or rendering engine 102 used for rendering the material. For example, suppose that at step 506, the GUI generation engine 116 determines that a red brick material is to be exposed to the user of the rendering application 104. At step 508, the GUI generation engine 116 may select from one of two available UI objects 114 for the red brick material. A first UI object may include over a dozen editable material parameters for the red brick material; whereas, a second UI object may include only three editable material parameters for the red brick material. The decision of which UI object to select is based on the configuration information. For example, for a high-end motion picture editor application, the GUI generation engine 116 may select the first UI object, but for an architectural application, the GUI generation engine 116 may select the second UI object.

At step 510, the GUI generation engine 116 selects a UI element for each editable material parameter in the selected UI object based on the configuration information 106. As described above, certain editable material parameters are predisposed to having varying degrees of complexity. For example, a "color" editable material parameter can be represented with a single value, e.g., a hexadecimal color value. Alternatively, the "color" editable material parameter may be represented with dozens of values, including RGB values, contrast, transparency, cyan-magenta-yellow-black (CMYK) values, saturation, and hue, among others. The GUI generation engine 116 selects the appropriate UI elements based on the configuration information 106. Additionally, for a particular UI element, a different tool may be selected to manipulating the values of the UI element. For example, for a first type of rendering application, the GUI generation engine 116 may select a slider UI element or construct, whereas, for a second type of rendering application, the GUI generation engine 116 may select a drop-down list UI element or construct.

At step 512, the GUI generation engine 116 selects vocabulary for each editable material parameter of the selected UI objects based on the configuration information 106. For example, users of a first type of rendering application may refer to the bumpiness of a material as a "grain" parameter; whereas, users of a second type of rendering application may refer to the bumpiness of the material as a "texture" parameter. The editable material parameter 310 that is displayed in the editable parameters window 126 may include the appropriate label, e.g, "grain" or "texture," based on the configuration information 106.

At step 514, the GUI generation engine 116 selects one or more rendering implementations used for rendering the materials included in the first set of materials based on the configuration information. As described above, embodiments of the invention allow users of a rendering application 104 to select between one or more rendering engines 102 or rendering engine implementations with which to render the material is a scene. One rendering engine 102 or rendering engine implementation may be more suitable for a particular type of user. In one embodiment, the GUI generation engine 116 exposes only those rendering engines 102 or rendering engine implementation are relevant to a particular user based on the configuration information 106.

Figure 6:
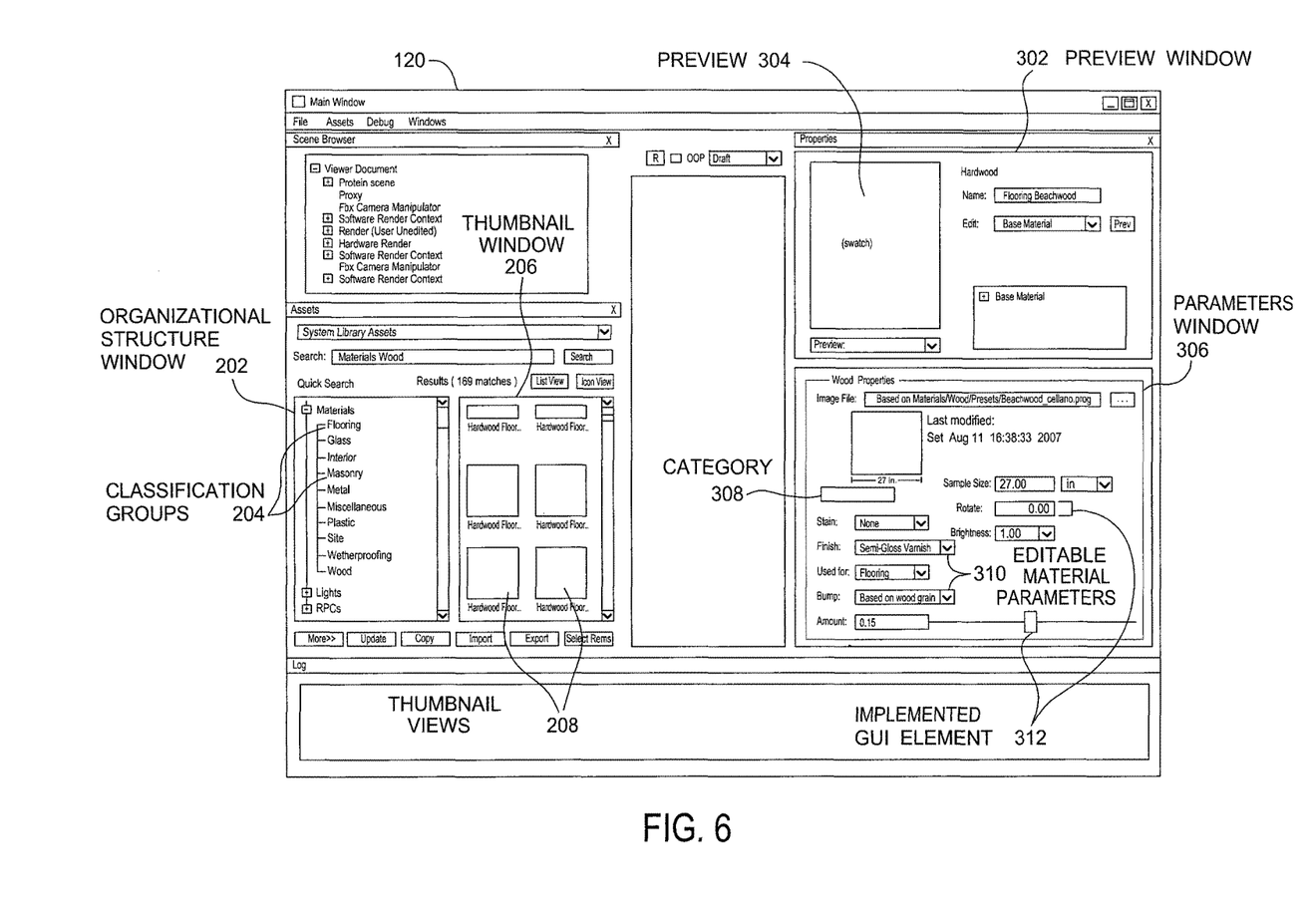
FIG. 6 is a screenshot of an exemplary GUI for a selected material, according to one embodiment of the invention.

At step 516, the GUI generation engine 116 causes the GUI 120 to be displayed. An exemplary GUI 120 is shown in FIG. 6. In one embodiment of the invention, any one of steps 506 through 514 is optional. For example, for a particular rendering application, step 506 is skipped (e.g., all available materials are exposed), but steps 508 through 514 are completed. In this example, all of the materials available in the material library 108 are exposed to the user, but selections of particular UI objects and UI elements are performed by the GUI generation engine 116. In alternative embodiments, the selection at any one of steps 504 through 506 may be overridden by the user of the rendering application 104. For example, at step 506, the GUI generation engine 116 may not expose any brick materials to the user based on the configuration information 106. However, the user may manually request that the brick materials be exposed. In other words, the configuration information 106 serves as a default for the selections at steps 506 through 514, but the selections may be superseded by the user.

FIG. 6 is a screenshot of an exemplary GUI 120 for a selected material, according to one embodiment of the invention. The organizational structure window 202 is configured to display the organizational structure including only those materials selected by the GUI generation engine 116. As described herein, selection of which materials to make available to a user is based on the configuration information 116, which may include type of rendering application, user market segment, registry information, an environment variable, rendering expertise of the user, and the like. Thumbnail views 208 of the exposed materials belonging to a selected classification group are displayed in the thumbnail window 206 of the GUI 120. Once a user selects a particular material, a preview 304 of that material is displayed in the preview window 302 of the GUI 120. As previously described herein, the GUI generation engine 116 may select a particular UI object 114 for the material based on the configuration information. The UI object 114 may specify the editable material parameters 310 and corresponding UI elements 312 to display to the user. The editable material parameters 310, the specific implemented GUI elements 312 used to modify the values of those editable material parameters 310, and the category 308, if any, to which one or more of the editable material parameters 310 belong, are displayed to the user within the parameters window 306 of the GUI 120.

Figure 7:
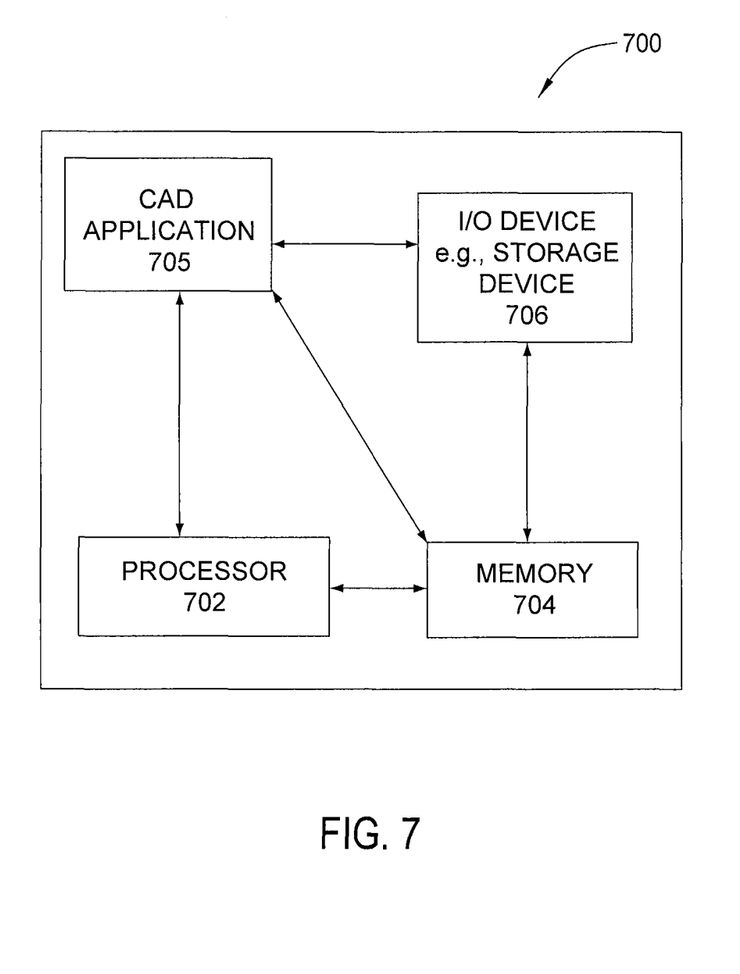
FIG. 7 depicts a high level block diagram of a general purpose computer configured to implement one or more aspects of the present invention.

FIG. 7 depicts a high level block diagram of a general purpose computer configured to implement one or more aspects of the present invention. As shown, system 700 includes a processor element 702 (e.g., a CPU), a memory 704, e.g., random access memory (RAM) and/or read only memory (ROM), a CAD application 705 configured with a predictive material editor, as described herein, and various input/output devices 706, which may include storage devices, including but not limited to, a tape drive, a floppy drive, a hard disk drive or a compact disk drive, a receiver, a transmitter, a speaker, a display, a speech synthesizer, an output port, and a user input device such as a keyboard, a keypad, a mouse, and the like.

Advantageously, embodiments of the invention provide for a technique for exposing only those materials, UI objects, editable material parameters, UI elements, vocabulary, rendering engines, and/or rendering engine implementations that are relevant to the user of a particular rendering application. In this way, the GUI and material browser of a rendering application are not cluttered with unnecessary materials that the user will likely never use. Additionally, exposing only particular editable material parameters, UI elements, and vocabulary allows for a more user-friendly experience. For example, the user is more likely to understand what effect changes to the values of the parameters will have on the physical or display characteristics of a material.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

What is claimed:

1. A method for generating a user interface within a graphics application for a set of materials, wherein each material includes a material definition and is capable of being applied to a geometry in a graphics scene when performing a rendering operation, the method comprising:
determining that a first set of materials is associated with configuration information related to a computer system environment, wherein each material represents a texture map related to a selected surface and comprises a definition that specifies a set of editable material parameters for the material, wherein a first implementation object included in a plurality of implementation objects translates the set of editable material parameters into a format compatible with a first rendering engine included in a plurality of rendering engines, wherein each implementation object included in the plurality of implementation objects is associated with a different rendering engine included in the plurality of rendering engines, and wherein each editable material parameter specifies a characteristic of the material for the first rendering engine to use in the rendering operation in which the material is applied to the geometry;
selecting the first set of materials to be displayed in a graphical user interface; and
displaying the graphical user interface to an end-user.

2. The method of claim 1, wherein the configuration information is associated with an industry in which the end-user participates.

3. The method of claim 1, wherein the configuration information is associated with the graphics application being implemented by the end-user or a market segment corresponding to the graphics application.

4. The method of claim 1, wherein the configuration information comprises metadata associated with the graphics application, an environment variable, a preset file, or a registry entry.

5. The method of claim 1, further comprising:
determining that a second set of materials is not associated with the configuration information; and
not selecting the second set of materials to be displayed in the graphical user interface.

6. The method of claim 1, wherein the first set of materials is stored in a material library, wherein the material library is located within a memory subsystem within the computer system or on a computing device remote to the computer system.

7. The method of claim 1, further comprising determining, for each material included in the first set of materials, a first set of editable material parameters to display in the graphical user interface that is not inclusive of all editable material parameters associated with the material.

8. The method of claim 7, further comprising determining, for each editable material parameter included in the first set of editable material parameters, a first set of user interface elements to include in the graphical user interface to modify the physical or display characteristics of the material.

9. The method of claim 7, further comprising:
selecting, based on the configuration information, for each editable material parameter included in the first set of editable material parameters, a vocabulary that describes physical or display characteristics of the editable material parameter; and
displaying each editable material parameter in the graphical user interface with appropriate vocabulary.

10. The method of claim 1, further comprising determining, based on the configuration information, a first set of rendering engine implementations to expose in the graphical user interface that is not inclusive of all rendering engine implementations available within the computer system for performing the rendering operation.

11. The method of claim 10, wherein a first rendering engine implementation provides a translation between a first set of values associated with each of the editable material parameters in the first set of editable material parameters to a second set of values.

12. The method of claim 1, further comprising receiving an end-user request to override the selection of the first set of materials to be displayed in the graphical user interface, and displaying in the graphical user interface a second set of materials associated with the end-user request that is not included in the first set of materials.

13. The method of claim 1, wherein the first implementation object translates the set of editable material parameters by generating multiple parameters for the first rendering engine from a first editable material parameter included in the set of editable material parameters.

14. The method of claim 1, further comprising:
selecting, based on the configuration information, one of a first user interface object and a second user interface object to include in the graphical user interface;
wherein:
the first user interface object defines a first subset of editable material parameters included in the set of editable material parameters to display in the graphical user interface, and the second user interface object defines a second subset of editable material parameters included in the set of editable material parameters to display in the graphical user interface.

15. One or more non-transitory computer-readable media storing instructions, that when executed by one or more processors, cause a graphics application to generate a user interface for a set of materials, wherein each material includes a material definition and is capable of being applied to a geometry in a graphics scene when performing a rendering operation, by performing the step of:
   determining that a first set of materials is associated with configuration information related to a computer system environment, wherein each material represents a texture map related to a selected surface and comprises a definition that specifies a set of editable material parameters for the material, wherein a first implementation object included in a plurality of implementation objects translates the set of editable material parameters into a format compatible with a first rendering engine included in a plurality of rendering engines, wherein each implementation object included in the plurality of implementation objects is associated with a different rendering engine included in the plurality of rendering engines, and wherein each editable material parameter specifies a characteristic of the material for the first rendering engine to use in the rendering operation in which the material is applied to the geometry;
   selecting the first set of materials to be displayed in a graphical user interface; and
   causing the graphical user interface to be displayed to an end-user.

16. The one or more computer-readable media of claim 15, wherein the configuration information is associated with an industry in which the end-user participates.

17. The one or more computer-readable media of claim 15, wherein the configuration information is associated with the graphics application being implemented by the end-user or a market segment corresponding to the graphics application.

18. The one or more computer-readable media of claim 15, wherein the configuration information comprises metadata associated with the graphics application, an environment variable, a preset file, or a registry entry.

19. The one or more computer-readable media of claim 15, further comprising:
   determining that a second set of materials is not associated with the configuration information; and
   not selecting the second set of materials to be displayed in the graphical user interface.

20. The one or more computer-readable media of claim 15, wherein the first set of materials is stored in a material library, wherein the material library is located within a memory subsystem within the computer system or on a computing device remote to the computer system.

21. The one or more computer-readable media of claim 15, further comprising the step of determining, for each material included in the first set of materials, a first set of editable material parameters to display in the graphical user interface that is not inclusive of all editable material parameters associated with the material.

22. The one or more computer-readable media of claim 21, further comprising the step of determining, for each editable material parameter included in the first set of editable material parameters, a first set of user interface elements to include in the graphical user interface to modify the physical or display characteristics of the material.

23. The one or more computer-readable media of claim 21, further comprising:
   selecting, based on the configuration information, for each editable material parameter included in the first set of editable material parameters, a vocabulary that describes physical or display characteristics of the editable material parameter; and
   displaying each editable material parameter in the graphical user interface with appropriate vocabulary.

24. The one or more computer-readable media of claim 15, further comprising the step of determining, based on the configuration information, a first set of rendering engine implementations to expose in the graphical user interface that is not inclusive of all rendering engine implementations available within the computer system for performing the rendering operation.

25. The one or more computer-readable media of claim 24, wherein a first rendering engine implementation provides a translation between a first set of values associated with each of the editable material parameters in the first set of editable material parameters to a second set of values.

26. The one or more computer-readable media of claim 15, further comprising the steps of receiving an end-user request to override the selection of the first set of materials to be displayed in the graphical user interface, and displaying in the graphical user interface a second set of materials associated with the end-user request that is not included in the first set of materials.

27. A computer device, comprising:
   a processing unit; and
   a memory coupled to the processing unit and storing instructions that, when executed by the processing unit, cause the processing unit to:
      determine that a first set of materials is associated with configuration information related to a computer system environment, wherein each material represents a texture map related to a selected surface and comprises a definition that specifies a set of editable material parameters for the material, wherein a first implementation object included in a plurality of implementation objects translates the set of editable material parameters into a format compatible with a first rendering engine included in a plurality of rendering engines, wherein each implementation object included in the plurality of implementation objects is associated with a different rendering engine included in the plurality of rendering engines, and wherein each editable material parameter specifies a characteristic of the material for the first rendering engine to use in the rendering operation in which the material is applied to the geometry;
      select the first set of materials to be displayed in a graphical user interface; and
      cause the graphical user interface to be displayed to an end-user.

28. A method for generating a user interface within a graphics application for a set of materials, wherein each material includes a material definition and is capable of being applied to a geometry in a graphics scene when performing a rendering operation, the method comprising:
   determining that a first set of materials is associated with configuration information related to a computer system environment, wherein each material represents a texture map related to a selected surface and comprises a definition that specifies a set of editable material parameters for the material, wherein a first implementation object included in a plurality of implementation objects translates the set of editable material parameters into a format compatible with a first rendering engine included in a plurality of rendering engines, and wherein each editable material parameter specifies a characteristic of the material to use in the rendering operation in which the material is applied to the geometry;

selecting the first set of materials to be displayed in a graphical user interface; and displaying the graphical user interface to an end-user.

* * * * *